Dec. 27, 1966  J. E. COTTLE  3,294,772
SUPERCRITICAL POLYMERIZATION
Filed June 17, 1963
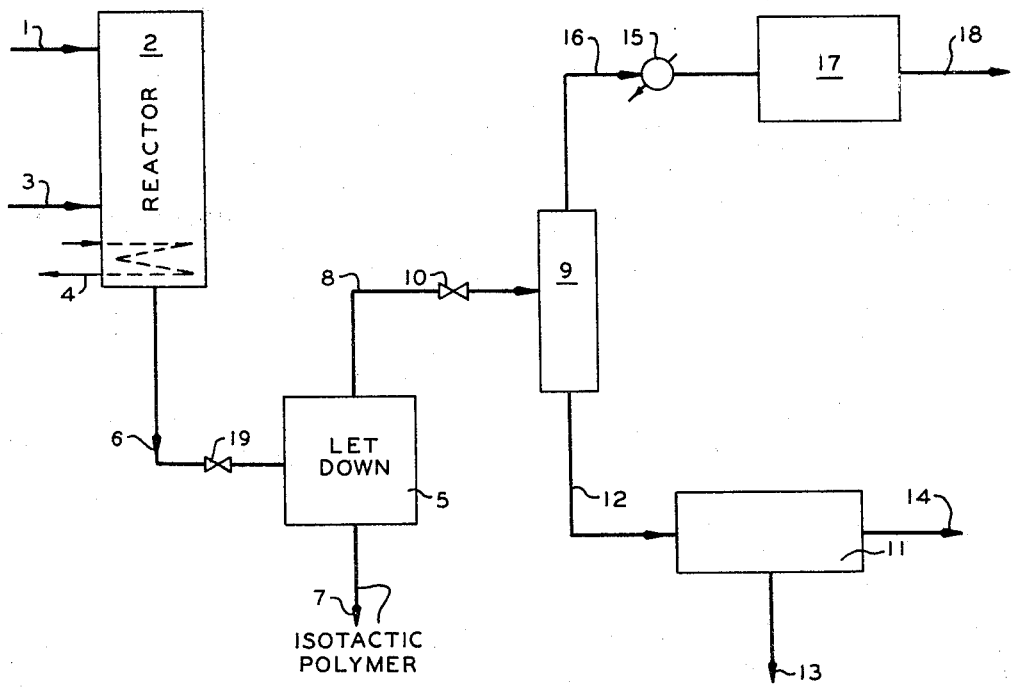
INVENTOR.
J. E. COTTLE
BY *Young & Quigg*
ATTORNEYS United States Patent Office 3,294,772
Patented Dec. 27, 1966

3,294,772
SUPERCRITICAL POLYMERIZATION
John E. Cottle, Bartlesville, Okla., assignor to Phillips Petroleum Company, a corporation of Delaware
Filed June 17, 1963, Ser. No. 288,393
1 Claim. (Cl. 260—93.7)

This invention relates to a method for the production and recovery of polymers. More particularly, this invention relates to a method for the production and subsequent separation of polymers of 1-olefins having at least 3 carbon atoms therein. In one aspect this invention relates to a method for separating the polymer components of the total polymer product produced by the polymerization of 1-olefins having at least 2 carbon atoms therein. In another aspect this invention relates to a method for separating the crystalline and non-crystalline components of polypropylene by producing and separating same under supercritical conditions.

In the production of polymers of 1-olefins having at least 3 carbon atoms therein, there generally is produced in the total polymer product a mixture both of crystalline and essentially non-crystalline polymers. For many purposes it is desirable that the non-crystalline portion of the total polymer be removed prior to the subsequent utilization of the more desirable crystalline material. However, such a separation heretofore has required the insertion of various apparatus and the application of various techniques, such as solvent extraction. Thus, a system which would give a maximum of the preferred highly crystalline component of the total polymer which is essentially free of the less preferred non-crystalline component and which would eliminate the additional treatment and apparatus as heretofore required would be of considerable value to the art.

It is thus an object of this invention to provide a process for the production and separation of polymers of 1-olefins. Another object of this invention is to provide a process for the production of crystalline 1-olefin polymers essentially free of the non-crystalline portion of the total polymer produced. A still further object of this invention is to provide a process for the production of a maximum amount of crystalline polypropylene essentially free from non-crystalline polymers otherwise produced therewith.

Other objects, aspects, and the several advantages of the invention will be apparent from a study of the disclosure, the drawing and the appended claims.

In accordance with the present invention, I have discovered that by producing polymers of 1-olefins containing from 3 to 8 carbon atoms under conditions of temperature and pressure which are above the critical values of the solvent, and then flashing the reactor effluent consisting of polymer, monomer, diluent and catalyst, a precipitation of the desired crystalline polymer is achieved while the non-crystalline polymer content of the total effluent remains unprecipitated. The non-crystalline portion of the effluent is recovered by fractionation of the remaining solution of non-crystalline polymer, catalyst, solvent and monomer. Unreacted monomer and diluent can be collected for recycle.

The process of my invention is more readily described in conjunction with the accompanying drawing, which is a schematic view of the process of the invention. As shown in the drawing, monomer such as propylene is introduced by means of line 1 into reactor 2. A catalyst, such as diethyl aluminum chloride and the reaction product obtained by reacting aluminum and titanium tetrachloride, is introduced into the reactor via conduit 3. The reactor is operated with both temperature and pressure above the critical values for propylene. A circulating coolant is passed through cooler 4 to control the temperature. After the reaction has proceeded to the desired extent, the reactor effluent is introduced to tank 5 via letdown valve 19 in conduit 6. Temperature and pressure conditions are such in letdown tank 5 that some propylene flashes and a slight cooling is achieved of the effluent mass, thereby precipitating crystalline polymer. A slurry of the crystalline polymer is removed via conduit 7 for additional treatment. Throttle valves 19 and 10 serve to regulate the conditions in letdown tank 5. The remainder of the effluent from the reactor, i.e., a solution of non-crystalline polymer in propylene, is passed via conduit 8 to fractionator 9 where separation of the polymer and solvent is achieved. The concentrated polymer solution in fractionator bottoms is then passed to a solvent recovery step, such as flash zone or steam stripper 11, by means of conduit 12 from which polymer is removed via conduit 13 and monomer is recovered via line 14 for recycle. Overhead monomer is condensed by condenser 15 positioned in conduit 16; part of the condensed monomer diluent is returned as reflux to fractionator 9 and the remainder is passed to storage tank 17 for use as required.

A suitable catalyst system for preparing the polymer in accordance with this invention includes those disclosed in Hogan and Banks U.S. Patent 2,825,721 (1958). Another suitable catalyst system comprises that in which a first starting material is an organometal compound, including those where one or more, but not all, organo groups are replaced by halogen, a metal hydride, or a metal of Groups I, II or III, and the second starting component is a metal compound of Groups IV to VI or VIII (Mendeleef's Periodic System). The organometal compounds referred to include, without limitation, alkyl, cycloalkyl, or aryl compounds of mono-, di-, tri- or tetravalent metals, particularly aluminum, gallium, indium, beryllium, sodium, potassium, lithium, rubidium, cesium, magnesium, cadmium, mercury, zinc, barium, lead and tin, or such organometal compounds where one or more, but not all, of the alkyl, cycloalkyl or aryl groups are replaced by a hydrogen atom and/or a halogen atom. The organo groups can be quite large, compounds being applicable having 15 or more carbon atoms in each alkyl, cycloalkyl or aryl group and 40 or more carbon atoms in the molecule. Specific examples of such organometal compounds include trimethylaluminum, triethylaluminum, triisobutylaluminum, a mixture of diethylaluminum chloride and ethylaluminum dichloride (sometimes referred to as ethylaluminum sesquichloride), diethylaluminum hydride, ethylaluminum dichloride, or diethylaluminum chloride taken alone; trioctylaluminum, tridodecylaluminum, triphenylaluminum, triphenylgallium, diphenylberyllium, dicyclohexylberyllium, cyclohexylzinc fluoride, tetraphenyllead, tetraethyltin; and $CH_3AlCl_2$, $(CH_3)_2AlCl$, $C_2H_5AlCl_2$, $(C_4H_9)AlBr$, $C_8H_{17}AlI_2$, $(C_3H_7)_2GaF$, $(C_6H_{11})_2$ GaCl (cyclohexane derivative)

$C_6H_5GaBr_2$, $C_{20}H_{41}GaBr_2$, $(C_{14}H_{29})_2GaF$, $(C_6H_5)_2InCl$, $C_8H_{17}InF_2$  $C_6H_{11}InBr_2$ (cyclohexane derivative)

$C_{17}H_{35}BeI$, $CH_3BeBr$, and the like.

The metal hydrides can include, as specific examples, aluminum hydride, lithium aluminum hydride, barium hydride, gallium hydride, indium hydride, sodium aluminum hyride, and potassium beryllium hydride.

The metals of the first, second and third groups are applicable as a class, the most important members being sodium, magnesium and aluminum.

The compounds of a metal of Groups IV to VI or VIII of the Periodic System include the oxides, hydrides, halies, oxyhalides and salts of organic acids, usually having 20 or less carbon atoms, such as formic acid, of the Groups IV to VI or VIII metals such as titanium, zirconium, chromium, thorium, molybdenum, vanadium and iridium.

A third catalyst starting component which can be advantageously used is an organic halide or metal halide where the organic radical has 30 or less carbon atoms and is an alkyl, cycloalkyl or aryl group. Specific examples include ethyl bromide, ethyl trichloro titanium, 1-bromobenzene and cyclohexyl chloride. Also applicable are the alkali metal or ammonium halide, and aluminum halide (where the catalyst also includes another metal compound such as a titanium compound), a halogen, a hydrogen halide, a complex hydride, a mixture of an organic halide and a metal, and a Grignard reagent.

Examples of suitable catalyst systems in accordance with the foregoing are as follows:

(a) Aluminum trialkyls, e.g. triethylaluminum or triisobutyl-aluminum, and the tri- or tetravalent metal halides of the type represented by titanium tri- or tetrachloride, for example titanium trichloride and triisobutylaluminum;

(b) An organic halide, such as ethyl bromide, a Group IV inorganic halide (such as titanium tetrachloride), and a low valence metal selected from the group consisting of alkali metals, beryllium, magnesium, zinc, cadmium, mercury, aluminum, gallium, indium and thallium, for example magnesium, ethyl bromide and titanium tetrachloride, as such or with the addition of metallic aluminum;

(c) A Group IV metal halide, for example titanium tetrachloride, and a metal identified in (b), for example sodium, aluminum or magnesium;

(d) A mixture of titanium hydride and an organometal compound exemplified by aluminum alkyl halide, i.e. a mixture of titanium hydride and ethylaluminum sesquichloride;

(e) Titanium dioxide and an organometal compound such as trialkylaluminum or aluminum alkyl chlorides, e.g. a mixture of titanium dioxide and ethylaluminum sesquichloride;

(f) A mixture of molybdenum pentachloride and organometal compounds and halides exemplified by triisobutylaluminum or triethylaluminum and ethylaluminum dichloride;

(g) A mixture of complex metal halides, exemplified by potassium fluotitanate, and an organometal compound and halide exemplified by triethylaluminum and diethylaluminum chloride;

(h) A mixture of a derivative selected from the oxides of molybdenum, alkali metal and ammonium molybdate, and an organometal compound or halide exemplified by triisobutylaluminum and isobutylaluminum dichloride;

(i) A mixture of a derivative of iridium, platinum and osmium, selected from the group consisting of halides or oxides, and complex compounds of iridium, platinum and osmium, the complex compounds corresponding to the formula $M_xM'X_y$ wherein M is an alkali metal or an ammonium radical, M' is iridium, platinum or osmium, X is a halogen, and $y$ is at least one, and the sum of $x$ and $y$ is equal to the valence of M', and a metallic organic compound exemplified by triethylaluminum, for example iridium chloride and triethylaluminum or ethylaluminum sesquichloride;

(j) At least one derivative selected from the group consisting of oxides, halides and oxyhalides of vanadium and complex salts of said halides with a member selected from the group consisting of ammonium halide and an alkali metal halide, and an organometal compound exemplified by triethylaluminum, for example vanadium oxide and triethylaluminum;

(k) A mixture of a derivative of a Group VI metal selected from the group consisting of halides, oxyhalides, hydroxyhalides, oxyhydroxyhalides of a metal selected from the group consisting of molybdenum, tungsten, uranium, selenium, tellurium and polonium, and complex salts of said halides and said oxyhalides with a member selected from the group consisting of halides of sodium, potassium, lithium, rubidium, cesium and ammonia and an organometal compound exemplified by triethylaluminum, for example molybdenum pentachloride and ethylaluminum dichloride;

(l) A chromyl halide and at least one of the following: (1) a metal hydride or an organometal, (2) an organometal halide, and (3) a mixture of an organic halide and a metal, for example chromyl chloride, ethyl bromide and magnesium;

(m) At least one halide of titanium, zirconium or hafnium, and at least one hydride of lithium, sodium, potassium, rubidium, cesium, magnesium, calcium, strontium, barium, lanthanum or thorium, for example zirconium tetrachloride and calcium hydride;

(n) (1) a hydrocarbon derivative of one of the metals zinc, cadmium, mercury and magnesium, and (2) a member selected from the group consisting of halides of titanium, zirconium, vanadium and molybdenum; oxyhalides of titanium, zirconium, vanadium, molybdenum and chromium; and complex salts of said halides and oxyhalides with a member selected from the group consisting of halides of the alkali metals and ammonia, for example diethylzinc and titanium tetrachloride;

(o) (1) a tri- or tetrahalide of titanium, zirconium, hafnium and germanium; (2) an organophosphorus-containing compound; and (3) at least one of the following: (a) an organometal halide, (b) a mixture of an organic halide and a metal, and (c) a complex hydride, for example triethylaluminum, titanium tetrachloride and triphenylphosphine;

(p) (1) a tri- or tetrahalide of titanium, zirconium, hafnium or germanium; (2) a peroxide of the formula R'''OOR''' wherein R''' is hydrogen, alkyl, aralkyl, alkaryl, cycloalkyl, acyl, alkyne or aryl; and (3) at least one of the following: (a) an organometal halide, (b) a mixture of an organic halide and a metal, and (c) a complex hydride, for example ethylaluminum sesquichloride, titanium tetrachloride and benzoyl peroxide;

(q) (1) a halide of titanium, zirconium, hafnium or germanium; (2) a hydride selected from the group consisting of hydrides of aluminum, gallium, indium, and thallium and complexes of said hydrides with alkali metal hydrides; and (3) an organic halide, for example titanium tetrachloride, lithium aluminum hydride and ethyl bromide.

The following example will serve to illustrate the invention, although the invention is not limited thereto.

*Example*

Propylene having a critical temperature of 197.4° F. and a critical pressure of 667 p.s.i.a. and TiCl₃-TEa catalyst formed from diethylaluminum chloride and the reaction product obtained by reacting aluminum and titanium tetrachloride were introduced into a reactor operated at a temperature of 210° F. and a pressure of 750 p.s.i.g. After a residence time of 2 hours, the reactor effluent was introduced into a letdown tank operated at 130 p.s.i.a. and 60° F. At this point the effluent was partially flashed so that essentially all of the crystalline polypropylene was precipitated and removed as a slurry. The remainder of the reactor effluent was then passed to a fractionation zone. The resulting non-crystalline polymer was then flashed to dryness whereby polymer was recovered and the liquid propylene overhead collected for reuse.

By maintaining the reactor at 210° F. and under pressure sufficient to keep the propylene solvent in a fluid form, the polymer components are dissolved therein; and the resulting stepwise flashing at two different temperatures and pressures serves to allow separation of the crystalline and non-crystalline components of the total polymer produced.

If desired, the reaction can be shortstopped prior to introduction of the effluent into the letdown tank.

While the above example has been limited to propylene and polypropylene, other compounds suitable for polymerization in accordance with this invention include 1-olefins containing 3 to 8 carbon atoms such as, for example, butene-1, 4-methylpentene-1, and the like.

In addition, the process of this invention is likewise applicable to separation of polyethylene. However, in this case the separation is based on the molecular weight distribution rather than the crystallinity of the resulting polymer mass.

Other solvents suitable for use in polymerization of 1-olefins of the invention include:

| Solvent | Critical Temp., °F. | Critical Pressure |
|---|---|---|
| Ethylene | 49.8 | 742.1 |
| Propane | 197.4 | 667 |
| n-Butane | 305.6 | 667 |

Other suitable polymerization systems include preparing polyethylene in ethylene, ethane or propane solvents, and preparing polypropylene in propylene, propane or butane solvents.

Generally the reaction will be carried out at a temperature and pressure above the critical temperature and pressure of the solvent medium.

Reasonable modifications can be made or followed in the light of the foregoing disclosure without departing from the spirit or scope thereof.

I claim:

A process for the separation of crystalline and non-crystalline polymer fractions of a polypropylene polymeric composition which comprises polymerizing propylene in a polymerization zone at a temperature and pressure above the critical temperature and pressure of propylene and in the absence of additional solvent, thereafter while maintaining sufficient pressure to retain propylene solvent in a fluid form lowering the supercritical pressure of the resulting polymer composition to precipitate only the crystalline portion of said polypropylene composition therefrom and to maintain the noncrystalline portion of said polypropylene composition in solution, thereafter fractionating the remaining solution of non-crystalline polypropylene and recovering separately as products of the process the resulting crystalline and non-crystalline polymer fractions.

References Cited by the Examiner

UNITED STATES PATENTS 3,073,812  1/1963  Henderson _____ 260—94.9

OTHER REFERENCES

Billmeyer, Textbook of Polymer Science, New York, (1962) page 227.

JOSEPH L. SCHOFER, *Primary Examiner.*

L. EDELMAN, *Assistant Examiner.*